US010043108B2

(12) United States Patent
Zhang et al.

(10) Patent No.: US 10,043,108 B2
(45) Date of Patent: Aug. 7, 2018

(54) METHOD AND APPARATUS FOR DETECTING AND CLASSIFYING ACTIVE MATRIX ORGANIC LIGHT EMITTING DIODE PANEL

(71) Applicants:BOE TECHNOLOGY GROUP CO. LTD., Beijing (CN); Ordos Yuansheng Optoelectronics Co., Ltd., Ordos, Inner Mongolia (CN)

(72) Inventors: Xuan Zhang, Beijing (CN); Hongxia Yang, Beijing (CN); Sungho Kim, Beijing (CN); Wei Song, Beijing (CN); Yaorong Liu, Beijing (CN); Ling Tong, Beijing (CN); Lin Liu, Beijing (CN); Yonghong Zhang, Beijing (CN); Peng Chen, Beijing (CN); Tao Yang, Beijing (CN); Tianyu Xu, Beijing (CN); Zenghong Li, Beijing (CN)

(73) Assignees: BOE TECHNOLOGY GROUP CO., LTD., Beijing (CN); Ordos Yuansheng Optoelectronics Co., Ltd., Ordos, Inner Mongolia (CN)

( * ) Notice: Subject to any disclaimer, the term of this patent is extended or adjusted under 35 U.S.C. 154(b) by 63 days.

(21) Appl. No.: 15/202,526

(22) Filed: Jul. 5, 2016

(65) Prior Publication Data
US 2017/0193330 A1    Jul. 6, 2017

(30) Foreign Application Priority Data

Jan. 4, 2016   (CN) .......................... 2016 1 0004771

(51) Int. Cl.
*G06K 9/68* (2006.01)
*G06K 9/62* (2006.01)
(Continued)

(52) U.S. Cl.
CPC .......... *G06K 9/6215* (2013.01); *G06K 9/036* (2013.01); *G06K 9/4652* (2013.01); *G06K 9/626* (2013.01);
(Continued)

(58) Field of Classification Search
None
See application file for complete search history.

(56) References Cited

U.S. PATENT DOCUMENTS 7,813,558 B2    10/2010  Hatabu
2004/0213449 A1*  10/2004  Safaee-Rad ........... G06T 7/0004
                                                     382/141
(Continued)

FOREIGN PATENT DOCUMENTS

| CN | 101477066 A | 7/2009 |
| CN | 102621156 A | 8/2012 |
| CN | 104463178 A | 3/2015 |

OTHER PUBLICATIONS

Wang, Zhiliang, et al. "OLED Defect Inspection System Development through Independent Component Analysis." Indonesian Journal of Electrical Engineering and Computer Science 10.8 (2012): 2309-2319. 11 pages.*

(Continued)

*Primary Examiner* — Ryan P Potts
(74) *Attorney, Agent, or Firm* — Kinney & Lange, P.A.

(57) ABSTRACT

A method and an apparatus are provided for detecting and classifying an active matrix organic light emitting diode panel. The method includes: comparing images to be compared which are collected from the active matrix organic light emitting diode panel with template images in a preset template image library; classifying the active matrix organic light emitting diode panel depending on results of the comparing.

13 Claims, 3 Drawing Sheets

(51) Int. Cl.
*G06T 7/90* (2017.01)
*G06T 7/00* (2017.01)
*G09G 3/3225* (2016.01)
*G06K 9/03* (2006.01)
*G06K 9/46* (2006.01)
*G09G 3/00* (2006.01)

(52) U.S. Cl.
CPC ......... *G06K 9/6223* (2013.01); *G06K 9/6255* (2013.01); *G06K 9/6857* (2013.01); *G06T 7/001* (2013.01); *G06T 7/90* (2017.01); *G09G 3/006* (2013.01); *G09G 3/3225* (2013.01); *G06T 2207/10024* (2013.01); *G06T 2207/30108* (2013.01)

(56) References Cited

U.S. PATENT DOCUMENTS

| | | | | |
|---|---|---|---|---|
| 2005/0254045 | A1* | 11/2005 | Weiss | G01N 21/95 356/237.5 |
| 2005/0285617 | A1* | 12/2005 | Weng | G09G 3/006 324/760.01 |
| 2007/0024576 | A1* | 2/2007 | Hassan | G06F 1/1632 345/156 |
| 2010/0201275 | A1* | 8/2010 | Cok | G06F 3/0412 315/158 |
| 2012/0027288 | A1* | 2/2012 | Yuan | G06K 9/6211 382/152 |
| 2014/0267683 | A1* | 9/2014 | Bibl | H01L 51/50 348/87 |
| 2016/0358041 | A1* | 12/2016 | Venkataraman | G06K 9/6254 |

OTHER PUBLICATIONS

Yoon, Young-Geun, et al. "An effective defect inspection system for polarized film images using image segmentation and template matching techniques." Computers & Industrial Engineering 55.3 (2008): 567-583. 18 pages.*

First Chinese Office Action, for Chinese Patent Application No. 2016100047717, dated Apr. 16, 2018, 11 pages.

* cited by examiner

METHOD AND APPARATUS FOR DETECTING AND CLASSIFYING ACTIVE MATRIX ORGANIC LIGHT EMITTING DIODE PANEL

CROSS-REFERENCE TO RELATED APPLICATION

This application claims benefits of Chinese Patent Application No. 201610004771.7, filed on Jan. 4, 2016 in the State Intellectual Property Office of China, which is incorporated herein by reference in entirety.

BACKGROUND OF THE INVENTION

Field of the Invention

The present disclosure relates to technical field of automatic control, and in particular to a method and an apparatus for detecting and classifying an active matrix organic light emitting diode panel.

Description of the Related Art

An active matrix organic light emitting diode panel (AMOLED) is called as the next generation display technology and has characteristics such as rapid response speed, high contrast, wide view of field. An electrical detection, as a trailing end process of AMOLED production, has significant effects on quality of products and analysis of defects at a front end process.

The conventional lighting detection method mainly depends on manpower. In the method, the AMOLED is observed by operators after it is lighted. In this way, great manpower will be necessary in a large scale production and the detection results tend to be affected subjectively by the operators, and in addition, excessive use of eyes may cause damage to the vision of operators such that the speed of detection and classification may be reduced and the accuracy may become poor.

SUMMARY

An embodiment of the present invention provides a method for detecting and classifying an active matrix organic light emitting diode panel, the method comprising: comparing images to be compared which are collected from the active matrix organic light emitting diode panel with template images in a preset template image library; classifying the active matrix organic light emitting diode panel depending on the comparing results.

An embodiment of the present invention provides an apparatus for detecting and classifying an active matrix organic light emitting diode panel, the apparatus comprising: a first unit configured to compare images to be compared which are collected from the active matrix organic light emitting diode panel with template images in a preset template image library; and a second unit configured to classify the active matrix organic light emitting diode panel depending on the comparing results.

DETAILED DESCRIPTION OF PREFERRED EMBODIMENTS OF THE INVENTION

An embodiment of the present application provides a method and an apparatus for detecting and classifying AMOLED. They may achieve automatic detection and classification for the AMOLED, improve work efficiency and accuracy of classifying the AMOLED, and avoid artificial detection errors and damage to eyes.

Currently, the conventional electrical detection depends on manpower and thus the detection results may be influenced subjectively by the operators and observing display devices for long time may cause visional fatigue and lead to errors in the detection results. In contrast, the embodiment of the present application provides a solution for automatic electrical detection and classification of the AMOLED based on similarity matching. In comparison with the conventional visual display screen defect detections, the image processing steps may be reduced to improve detection speed and work efficiency. It may save cost of manpower significantly and reduce cost for enterprises.

The embodiments of the present application will be explained below with reference to figures.

Figure 1:
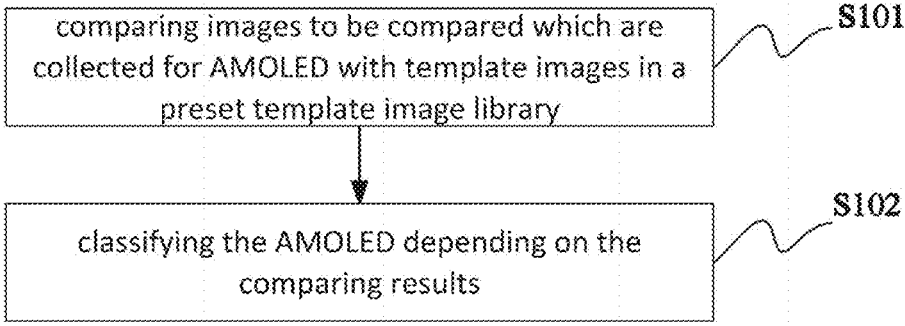
FIG. 1 is a schematic flow chart of a method for detecting and classifying AMOLED provided by an embodiment of the present application.

As shown in FIG. 1, an embodiment of the present application provides a method for detecting and classifying an active matrix organic light emitting diode panel. The method includes:

Step S101 of comparing images to be compared which are collected from the active matrix organic light emitting diode panel with template images in a preset template image library;

Step S102 of classifying the active matrix organic light emitting diode panel depending on the comparing results.

As an example, the images to be compared may include a plurality of images to be compared which are collected respectively from the active matrix organic light emitting diode panel. For example, each of the plurality of images to be compared may have a different color from others of the plurality of images.

In an example, the preset template image library may include a plurality of template images corresponding to at least one of the images to be compared respectively. As an example, the preset template image library may include a plurality of template images corresponding to all of the images to be compared respectively.

In an example, the template image library may include a first template image sub-library, which includes first type template images corresponding to at least one of the plurality of images to be compared respectively. As an example, the template image library may include a first template image sub-library, which includes a plurality of first type template images corresponding to all of the plurality of images to be compared respectively.

As an example, the first type template images may be fine template images (for example, for qualified active matrix organic light emitting diode panels).

In an example, the plurality of images to be compared comprise seven images in total comprising a red image, a green image, a blue image, a first gray image, a second gray image, a third gray image and a black image. The plurality of first type template images may include a first type red template image, a first type green template image, a first type blue template image, a first type first gray template image, a first type second gray template image, a first type third gray template image and a first type black template image. Comparing images to be compared which are collected from the active matrix organic light emitting diode panel with template images in a preset template image library may include comparing each of the images to be compared with a corresponding first type template image. Classifying the active matrix organic light emitting diode panel depending on the comparing results may include marking the active matrix organic light emitting diode panel as a first type product in case that all of the seven images to be compared are matched with seven corresponding first type template images respectively.

In an example, the template image library may further include a second template image sub-library, which comprises a plurality of second type template images corresponding to at least one or all of the plurality of images to be compared respectively.

In an example, the second type template images may be fault template images (for example, for unqualified active matrix organic light emitting diode panels).

In an example, the second type template image sub-library may include n groups of second type template images, where n is a positive integer greater than or equal to one. Comparing images to be compared which are collected from the active matrix organic light emitting diode panel with template images in a preset template image library may include comparing each of the images to be compared with a corresponding first type template image, and comparing the images to be compared with the second type template images in each group of second type template images respectively in case that any one of the images to be compared does not match with the corresponding first type template images. Classifying the active matrix organic light emitting diode panel depending on the comparing results may include marking the active matrix organic light emitting diode panel as a first type product in case that all of the images to be compared match with seven corresponding first type template images respectively, or marking the active matrix organic light emitting diode panel as a second type product with a numeral of i in case that all of the images to be compared match with $i^{th}$ group of second type template images respectively, where i is greater than or equal to one but less than or equal to n.

In an example, classifying the active matrix organic light emitting diode panel depending on the comparing results may further include: storing the images that do not match with any one of the n groups of second type template images into the second type template image sub-library and assigning the group which the images belong to. The method according to the embodiment of the present application may further include detecting and classifying the active matrix organic light emitting diode panel afresh.

In an example, comparing images to be compared which are collected from the active matrix organic light emitting diode panel with template images in a preset template image library may include: calculating similarity between the images to be compared which are collected from the active matrix organic light emitting diode panel and the template images in the preset template image library and comparing the similarity with a preset similarity threshold.

For example, if the similarity is greater than or equal to the preset similarity threshold, it will be determined that the images to be compared match with the template images in the preset template image library. In contrast, if the similarity is lower than the preset similarity threshold, it will be determined that the images to be compared do not match with the template images in the preset template image library.

Figure 2:
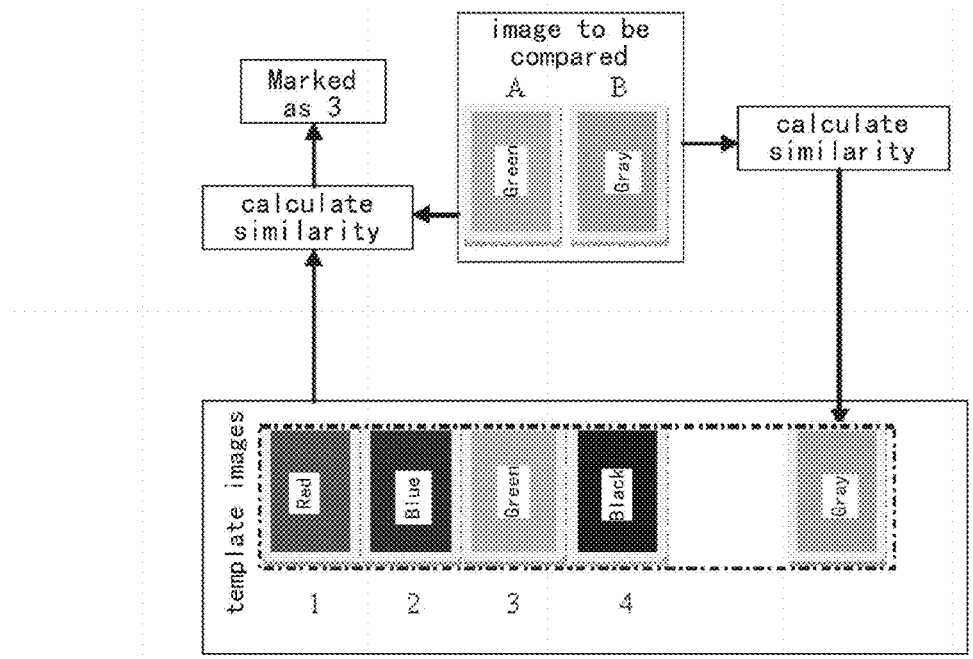
FIG. 2 is a schematic view showing principles of detecting and classifying AMOLED provided by an embodiment of the present application.

With reference to FIG. 2, in the embodiment of the present application, the automatic electrical detection and classification of the AMOLED based on similarity matching may primarily use a great deal of image information accumulated in test before large scale production, classify the template images by artificial and computer clustering methods and calculate similarity between the images to be compared and the template images, i.e., compare the images to be compared which are collected from AMOLED with the preset template image library. If the similarity between the images to be compared and a certain type of template images is greater than or equal to the preset threshold, it will be determined that the images to be compared coincide with this type of template images and these images may be marked corresponding to the type. If the images to be compared do not match with any type of template images after comparison, the images to be compared may be stored as new template images and the template images in the template image library may be reclassified and marked. Then, the AMOLED may be reclassified. Finally, the automatic selection and classification for the AMOLED may be achieved. As the number of the template images increases gradually, the chance of success in matching of the images to be compared is enhanced.

In an example, the plurality of images to be compared may include seven images in total, i.e., a red image, a green image, a blue image, a first gray image, a second gray image, a third gray image and a black image.

The preset template image library may include a fine template image sub-library. The fine template image sub-library may include seven fine template images in total, i.e., a red fine template image, a green fine template image, a blue fine template image, a first gray fine template image, a second gray fine template image, a third gray fine template image and a black fine template image.

Comparing images to be compared which are collected from the active matrix organic light emitting diode panel with template images in a preset template image library may include comparing each of the images to be compared with a corresponding fine template image with corresponding color.

Classifying the active matrix organic light emitting diode panel depending on the comparing results may include marking the active matrix organic light emitting diode panel as a fine product in case that all of the seven images to be compared match with seven corresponding fine template images with the corresponding colors respectively.

In the example, the images to be compared may for example be collected from the AMOLED in order of red, green, blue, first gray, second gray, third gray and black. One image is collected at each time and is compared with the fine template image with the corresponding color in the preset template image library. If it matches with the fine template image with the corresponding color, the collecting and comparing operation for the next image to be compared will be performed. For example, the red image to be compared may be collected at first from the AMOLED and may be compared with the red template image in the preset template image library. If the red image to be compared matches with the red template image, the green image to be compared may then be collected from the AMOLED and may be compared with the green template image in the preset template image library, and so on. If all of the red, green, blue, first gray, second gray, third gray and black images to be compared for the AMOLED match with the find template images with the corresponding colors, it will indicate that the AMOLED is a fine product and is marked and classified.

As an example, the preset template image library further includes a fault template image sub-library. The fault template image sub-library includes n groups of fault template images, where n is a positive integer greater than or equal to one.

Comparing images to be compared which are collected from the active matrix organic light emitting diode panel with template images in the preset template image library may further include comparing each of the images to be compared with the fault template image in the fault template image sub-library in case that any one of the images to be compared does not match with the fine template image with the corresponding color.

Classifying the active matrix organic light emitting diode panel depending on the comparing results may further include labeling the active matrix organic light emitting diode panel as i, i.e., marking the active matrix organic light emitting diode panel as a fault product with a numeral of i in case that the images to be compared match with $i^{th}$ group of fault template images respectively, where i is greater than or equal to one but less than or equal to n. That is, i is between 1 and n.

In an example, the images to be compared may for example be collected from the AMOLED in order of red, green, blue, first gray, second gray, third gray and black. For example, the red image to be compared may be collected at first from the AMOLED and may be compared with the red template image in the preset template image library. If the red image to be compared does not match with the red template image, the red image to be compared will be compared with the fault template image in the fault template image sub-library; otherwise, if the red image to be compared matches with the red template image, the green image to be compared will then be collected from the AMOLED.

Then, the green image to be compared may be compared with the green template image in the preset template image library. If the green image to be compared does not match with the green template image, the green image to be compared will be compared with the fault template image in the fault template image sub-library; otherwise, if the green image to be compared matches with the green template image, the blue image to be compared will then be collected from the AMOLED.

Then, the blue image to be compared may be compared with the blue template image in the preset template image library. If the blue image to be compared does not match with the blue template image, the blue image to be compared will be compared with the fault template image in the fault template image sub-library; otherwise, if the blue image to be compared matches with the blue template image, the first gray image to be compared will then be collected from the AMOLED.

Then, the first gray image to be compared may be compared with the first gray template image in the preset template image library. If the first gray image to be compared does not match with the first gray template image, the first gray image to be compared will be compared with the fault template image in the fault template image sub-library; otherwise, if the first gray image to be compared matches with the first gray template image, the second gray image to be compared will then be collected from the AMOLED.

Then, the second gray image to be compared may be compared with the second gray template image in the preset template image library. If the second gray image to be compared does not match with the second gray template image, the second gray image to be compared will be compared with the fault template image in the fault template image sub-library; otherwise, if the second gray image to be compared does match with the second gray template image, the third gray image to be compared will then be collected from the AMOLED.

Then, the third gray image to be compared may be compared with the third gray template image in the preset template image library. If the third gray image to be compared does not match with the third gray template image, the third gray image to be compared will be compared with the fault template image in the fault template image sub-library; otherwise, if the third gray image to be compared matches with the third gray template image, the black image to be compared will then be collected from the AMOLED.

Then, the black image to be compared may be compared with the black template image in the preset template image library. If the black image to be compared does not match with the black template image, the black image to be compared will be compared with the fault template image in the fault template image sub-library; otherwise, if the black image to be compared matches with the black template image, the AMOLED will be regarded as a fine product and is marked for classification, for example labeled as P.

In the example, when the images to be compared with any one of the above colors are compared with the fault template images in the fault template image sub-library, the comparing process is similar to the process for comparing, the images to be compared with any one of the colors, with the fine template image, that is, they are compared with the fault template images in each preset fault template image sub-library respectively. If the images to be compared match with any group of fault template images, the images to be compared will be marked as corresponding numeral. For example, if they match with the $i^{th}$ group of fault template images, the AMOLED will be marked as i.

In an example, classifying the active matrix organic light emitting diode panel depending on the comparing results may further include:

storing the images that do not match with any one of the groups of fault template images into the fault template image sub-library and assigning the group of fault template images which the images to be compared belong to.

The method according to the embodiment of the present application may further include detecting and classifying the active matrix organic light emitting diode panel afresh.

In the above embodiments, each group of second type template images (for example fault template images) may include one or more second type template images (for example fault template images).

Figure 3:
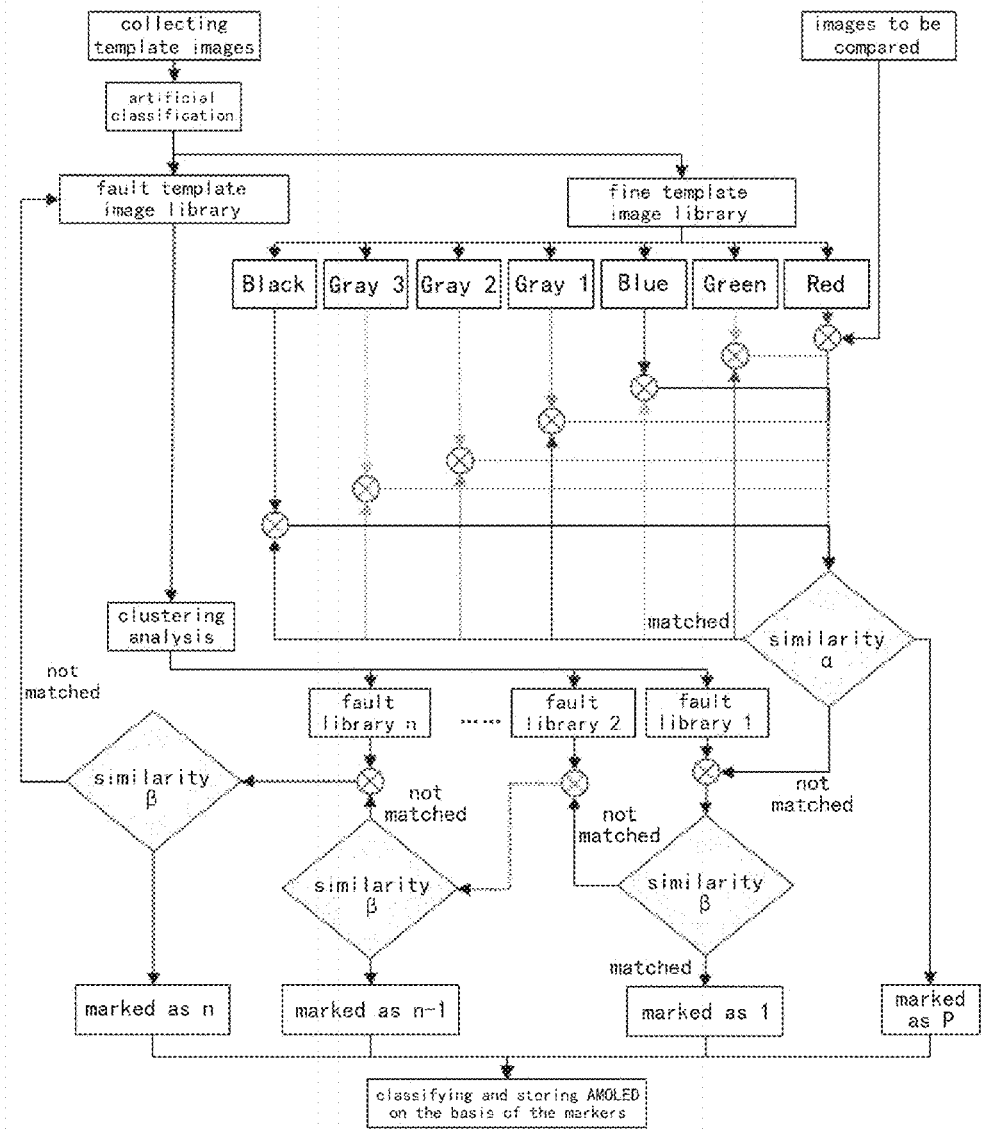
FIG. 3 is an exemplified schematic flow chart of a method for detecting and classifying AMOLED provided by an embodiment of the present application.

With reference to FIG. 3, the method for detecting and classifying the AMOLED, provided by the embodiments of the present application, includes:

I. Template Image Collection

The images for the lighted AMOLED are collected using Charge-Coupled Device (CCD). In order to prevent noises such as light source from affecting the image collection, the images are collected in full-dark environment. The images displayed on the AMOLED in different conditions are collected to establish the template image library subsequently. The library contains images of all fine display devices and images of all fault display devices that have occurred, that is, the fine template image sub-library and fault template image sub-library. The fine template image sub-library includes seven fine template images, i.e., red fine template images, green fine template images, blue fine template images, first gray fine template images, second gray fine template images, third gray fine template images and black fine template images. The fault template image sub-library includes n groups of fault template images, where n is a positive integer greater than or equal to one.

II. Artificial Classification

Through artificial filtering, the fine images meeting certain conditions are selected as fine template image sub-library, then, in term of lighting manner, these fine images are divided into seven kinds or groups of fine template images including red, green, blue, gray 1 (i.e., first gray), gray 2 (i.e., second gray), gray 3 (i.e., third gray) and black fine template images. The images that have been collected and filtered artificially are stored into a computer and stored in form of data matrix. All of operations of computer to the images are carried out on the basis of processing the data matrix.

III. Clustering

Clustering is performed for other images that do not match with fine template image library. Subtraction Clustering may be used to estimate the number of clusters in a set of data. To this end, an initial clustering is at first performed for the fault template image library using the Subtraction Clustering to obtain the number of clusters. The number of clusters is combined with artificial empirical division results while considering capacity of hardware, finally, the number n of the groups of fault template images may be determined. In case that the number of the groups of fault template images has been determined, the clustering is carried out again for the fault template image sub-library using Fuzzy C-Means Algorithm to obtain clustering results. In fuzzy clustering, each of the template images is not divided into a group of fault template images very strictly, but the group of fault template images to which the template images belong may be determined depending on the size of membership function. After fuzzy clustering, in each group of fault template images, the fault template images with same features are stored. The fault template images with same features are marked as fault 1, fault 2, . . . , fault n, respectively.

IV. Calculating the Similarity Between the Images to be Compared and the Template Images, that is, Comparing the Images to be Compared that are Collected from the AMO-LED with the Preset Template Image Library.

The images to be compared are collected using CCD with same parameters in the same environment as that of the template images. Seven images to be compared in total are collected from the same AMOLED respectively in order of red, green, blue, gray 1, gray 2, gray 3 and black. The similarity thresholds $\alpha$ and $\beta$ are provided in advance. The values of $\alpha$ and $\beta$ are provided empirically as required. Too small threshold may cause relatively high chance of success in matching, but the accuracy will be reduced. Too large threshold may miss the reasonable matching between the images to be compared and the template images. In terms of yield of the products leaving the factory, $\alpha$ is typically greater than or equal to 0.9 and $\beta$ is also typically greater than or equal to 0.9.

The seven images are acquired in order. Once an image is collected, it will be compared with the corresponding fine template image to obtain a similarity value. If the similarity value is greater than $\alpha$, the subsequent 6 images will be compared continuously in order; otherwise, the comparison in the fine template image sub-library ends and the comparison is performed on the fault template image sub-library.

Assuming that seven images to be compared are compared with red, green, blue, gray 1, gray 2, gray 3 and black fine template images respectively, the calculated similarities are $\alpha 1$, $\alpha 2$, $\alpha 3$, $\alpha 4$, $\alpha 5$, $\alpha 6$ and $\alpha 7$ respectively. For example, the similarity $\alpha 1$ is obtained from comparing the red image collected firstly with the red template images in the fine template sub-library. If $\alpha 1 < \alpha$, the comparing operation will end, otherwise, if $\alpha 1 \geq \alpha$, the green image will be collected and compared continuously, and so on. The AMOLED will be determined as a qualified product and marked as P until all of $\alpha 1$, $\alpha 2$, $\alpha 3$, $\alpha 4$, $\alpha 5$, $\alpha 6$ and $\alpha 7$ are greater than $\alpha$.

When any one of $\alpha 1$, $\alpha 2$, $\alpha 3$, $\alpha 4$, $\alpha 5$, $\alpha 6$ and $\alpha 7$ cannot meet the similarity $\alpha$, the comparison needs to be performed continuously in the fault template image sub-library to obtain the values of similarity for the fault template image groups 1 . . . n one by one. Until any one of $\beta 1, \beta 2, \ldots, \beta n$ is greater than $\beta$, the comparison will end and the AMOLED will be marked as i, where i is greater than or equal to one but less than or equal to n.

If the images to be compared do not match with all of groups of fault template images successfully, the images to be compared for the AMOLED will be stored into the fault template image sub-library, and then clustering is performed again to repeat the above steps for comparisons.

As the images stored into the fault template image sub-library increase, the matching rate of the images will be improved.

As an example, the step of calculating the similarity between the image to be compared and any template image includes:

Step One: calculating Mahalanobis distance between the image to be compared and the template image to represent the distance between two images. The Mahalanobis distance may be calculated as following equation:

$$\rho = \sqrt{(\bar{x}_H - \bar{x}_S)^T \sum_{S}^{*-1} (\bar{x}_H - \bar{x}_S)} \quad \text{(equation 1)}$$

where $\rho$ is Mahalanobis distance, $\bar{x}_H$ is a mean value of the template images, $\bar{x}_S$ is a mean value of the images to be compared, and $$\sum_{S}^{*-1}$$

is a pseudo inverse of covariance matrix of the imaged to be compared.

Step Two: converting the Mahalanobis distance calculated in the Step One into the similarity between the image to be compared and the template image on the basis of the following equation:

$$S = \sqrt{\frac{2}{\pi}} \int_{\rho}^{\infty} e^{\frac{t^2}{2}} dt = 1 - \text{erf}\left(\frac{\sqrt{2}}{2}\rho\right) \quad \text{(equation 2)}$$

where S is the similarity between the image to be compared and the template image, d is an integral symbol, t is an integral variable of the Mahalanobis distance, and the increment Δt of argument t is typically called as differential of the argument, written as dt, i.e., dt=Δt. In the above equation 2, erf( ) is an error function.

Figure 4:
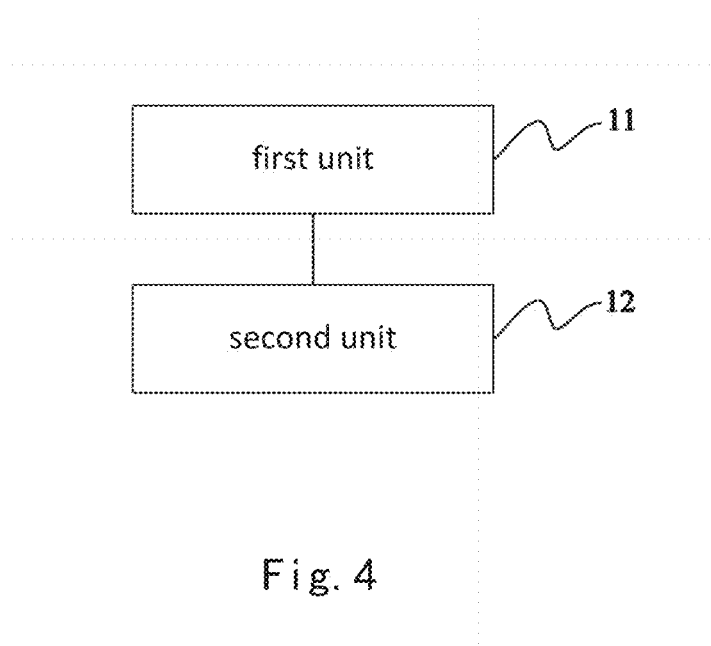
FIG. 4 is a schematic view showing a structure for an apparatus for detecting and classifying AMOLED provided by an embodiment of the present application.

Corresponding to the above method, with reference to FIG. 4, an embodiment of the present application provides an apparatus for detecting and classifying an active matrix organic light emitting diode panel. The apparatus includes: a first unit 11 configured to compare images to be compared which are collected from the active matrix organic light emitting diode panel with template images in a preset template image library; and a second unit 12 configured to classify the active matrix organic light emitting diode panel depending on the comparing results.

In an example, the images to be compared may include a plurality of images to be compared which are collected respectively from the active matrix organic light emitting diode panel.

In an example, the template image library includes a first template image sub-library, which includes a plurality of first type template images corresponding to at least one or all of the plurality of images to be compared respectively.

In an example, the plurality of images to be compared includes seven images in total comprising a red image, a green image, a blue image, a first gray image, a second gray image, a third gray image and a black image. The plurality of first type template images include a first type red template image, a first type green template image, a first type blue template image, a first type first gray template image, a first type second gray template image, a first type third gray template image and a first type black template image. The first unit 11 is configured to compare each of the images to be compared with the corresponding first type template images. The second unit 12 is configured to mark the active matrix organic light emitting diode panel as a first type product, in case that all of the seven images to be compared match with seven corresponding first type template images respectively.

In an example, the template image library further includes a second template image sub-library, which includes a plurality of second type template images corresponding to at least one or all of the plurality of images to be compared respectively.

In an example, the second type template image sub-library comprises n groups of second type template images, where n is a positive integer greater than or equal to one. The first unit 11 is configured to compare each of the images to be compared with the corresponding first type template images, and to compare the images to be compared with the second type template images in each group of second type template images respectively in case that any one of the images to be compared does not match with the corresponding first type template images. The second unit 12 is configured to mark the active matrix organic light emitting diode panel as a first type product in case that all of the images to be compared match with corresponding first type template images respectively, or to mark the active matrix organic light emitting diode panel as a second type product with a numeral of i in case that all of the images to be compared match with $i^{th}$ group of second type template images respectively, where i is greater than or equal to one but less than or equal to n.

In an example, the second unit 12 is further configured to: store the images that do not match with any one of the n groups of second type template images into the second type template image sub-library and to determine the group which the images belong to; and to trigger the first unit to detect and classify the active matrix organic light emitting diode panel afresh.

In an example, the first unit 11 is configured to calculate similarity between the images to be compared which are collected from the active matrix organic light emitting diode panel and the template images in the preset template image library and to compare the similarity with a preset similarity threshold.

In the example, the first unit and the second unit may both be implemented as solid devices such as a processor. Certainly, in addition to the above devices, the apparatus for detecting and classifying the AMOLED may include other solid devices such as memory configured to store associated data.

In an example, the apparatus for detecting and classifying the AMOLED provided by the embodiment of the present application may include: a processor and a memory, the processor including a first process to compare images to be compared which are collected from the active matrix organic light emitting diode panel with template images in a preset template image library; and a second process to classify the active matrix organic light emitting diode panel depending on the comparing results.

In an embodiment of the present application, the first gray (gray 1), the second gray (gray 2), the third gray (gray 3) may represent different levels of grays.

As discussed above, in the prior art, the detection and classification of the AMOLED depends on manpower. In contrast, in the embodiment of the present application, the images to be compared are collected from the AMOLED; the images to be compared are compared with the preset template image library and the AMOLED is marked for classification on the basis of the comparing results; and different kinds of AMOLED may be stored separately depending on the marking results. The apparatus may achieve automatic detection and classification for the AMOLED to improve the work efficiency and may improve the accuracy of classifying the AMOLED, avoid artificial detection errors and damage to eyes.

The skilled person in the art will appreciate that the embodiments of the present application may be implemented as methods, systems or computer program products. Thus, the present application may be implemented in form of pure hardware embodiments, pure software embodiments or combination of software and hardware embodiments. And the present application may use the form of computer program products implemented on one or more computer readable storage media (including, but not limited to, such as magnetic memory and optical memory) in which computer applicable program codes are contained.

The present application is described with reference to the flow charts and/or block diagrams of the methods, apparatuses (system) and computer program products. It should be understood that each flow and/or block in the flow chart and/or block diagram and combinations of flow and/or block in the flow chart and/or block diagram may be implemented as computer program instructions. These computer program instructions may be provided to processors of a general computer, a dedicated computer, an embedded processing device or other programmable data process apparatuses to generate a machine such that the instructions that are executed by the processor of the computer or other programmable data process apparatus generate means for achieving specified functions in one or more flows of the flow chart and/or one or more blocks of the block diagram.

These computer program instructions may also be stored in a computer readable memory that can guide the computer or other programmable data process apparatus to work in a certain manner, such that the instructions stored in the computer readable memory generate manufactures including instruction devices. The instruction devices may achieve the specified functions in one or more flows of the flow chart and/or one or more blocks of the block diagram.

These computer program instructions may also be loaded on the computer or other programmable data process apparatus, such that a series of operation steps may be executed on the computer or other programmable apparatuses to generate computer implementable processes. In this way, the instructions executed on the computer or other programmable apparatus may provide steps of achieving the specified functions in one or more flows of the flow chart and/or one or more blocks of the block diagram.

It would be appreciated by those skilled in the art that various changes and modifications may be made in the present application without departing from the principles and spirit of the disclosure. These changes and modifications will also fall within the scope of the present invention, delimited by appended claims and equivalents thereof.

What is claimed is:

1. A method for detecting and classifying an active matrix organic light emitting diode panel, the method comprising:
    comparing images to be compared which are collected from the active matrix organic light emitting diode panel with template images in a preset template image library; and
    classifying the active matrix organic light emitting diode panel depending on results of the comparing;
    wherein the images to be compared comprise a plurality of images to be compared which are collected respectively from the active matrix organic light emitting diode panel;
    wherein the preset template image library comprises:
        a first template image sub-library, which comprises a plurality of first type template images corresponding to at least one or all of the plurality of images to be compared respectively; and
        a second template image sub-library, which comprises a plurality of second type template images corresponding to at least one or all of the plurality of images to be compared respectively;
    wherein the second template image sub-library comprises n groups of second type template images, where n is a positive integer greater than or equal to one;
    wherein comparing images to be compared which are collected from the active matrix organic light emitting diode panel with template images in a preset template image library comprises comparing each of the images to be compared with a corresponding first type template image, and comparing the images to be compared with the second type template images in each group of second type template images respectively if any one of the images to be compared does not match with the corresponding first type template image; and
    wherein classifying the active matrix organic light emitting diode panel depending on results of the comparing comprises marking the active matrix organic light emitting diode panel as a first type product if all of the images to be compared match with corresponding first type template images respectively, or marking the active matrix organic light emitting diode panel as a second type product with a numeral of i if all of the images to be compared match with an $i^{th}$ group of second type template images respectively, where i is greater than or equal to one but less than or equal to n.

2. The method according to claim 1, wherein the preset template image library comprises a plurality of template images corresponding to at least one or all of the images to be compared respectively.

3. The method according to claim 1, wherein the first type template images are fine template images.

4. The method according to claim 1, wherein the plurality of images to be compared comprise seven images in total comprising a red image, a green image, a blue image, a first gray image, a second gray image, a third gray image and a black image;
    wherein the plurality of first type template images comprise a first type red template image, a first type green template image, a first type blue template image, a first type first gray template image, a first type second gray template image, a first type third gray template image and a first type black template image;
    wherein comparing images to be compared which are collected from the active matrix organic light emitting diode panel with template images in a preset template image library comprises comparing each of the images to be compared with a corresponding first type template image; and
    wherein classifying the active matrix organic light emitting diode panel depending on the comparing results comprises marking the active matrix organic light emitting diode panel as a first type product in case that all of the seven images to be compared match with seven corresponding first type template images respectively.

5. The method according to claim 1, wherein the second type template images are fault template images.

6. The method according to claim 1, wherein classifying the active matrix organic light emitting diode panel depending on results of the comparing further comprises:
    storing images that do not match with any one of the n groups of second type template images into the second type template image sub-library and assigning the group to which the images that do not match belong; and
    wherein the method further comprises detecting and classifying the active matrix organic light emitting diode panel afresh.

7. The method according to claim 1, wherein comparing images to be compared which are collected from the active matrix organic light emitting diode panel with template images in a preset template image library comprises:
    calculating similarity between the images to be compared which are collected from the active matrix organic light emitting diode panel and the template images in the preset template image library and comparing the similarity with a preset similarity threshold.

8. The method according to claim 1, wherein each of the plurality of images to be compared has a different color from colors of other images of the plurality of images.

9. An apparatus for detecting and classifying an active matrix organic light emitting diode panel, the apparatus comprising:
    a first unit configured to compare images to be compared which are collected from the active matrix organic light emitting diode panel with template images in a preset template image library; and
    a second unit configured to classify the active matrix organic light emitting diode panel depending on results of the comparing;

wherein the images to be compared comprise a plurality of images to be compared which are collected respectively from the active matrix organic light emitting diode panel;

wherein the preset template image library comprises:
a first template image sub-library, which comprises a plurality of first type template images corresponding to at least one or all of the plurality of images to be compared respectively; and
a second template image sub-library, which comprises a plurality of second type template images corresponding to at least one or all of the plurality of images to be compared respectively;

wherein the second template image sub-library comprises n groups of second type template images, where n is a positive integer greater than or equal to one;

wherein comparing images to be compared which are collected from the active matrix organic light emitting diode panel with template images in a preset template image library comprises comparing each of the images to be compared with a corresponding first type template image, and comparing the images to be compared with the second type template images in each group of second type template images respectively if any one of the images to be compared does not match with the corresponding first type template image; and wherein classifying the active matrix organic light emitting diode panel depending on results of the comparing comprises marking the active matrix organic light emitting diode panel as a first type product if all of the images to be compared match with corresponding first type template images respectively, or marking the active matrix organic light emitting diode panel as a second type product with a L numeral of i if all of the images to be compared match with an $i^{th}$ group of second type template images respectively, where i is greater than or equal to one but less than or equal to n.

10. The apparatus according to claim 9, wherein the plurality of images to be compared comprise seven images in total comprising a red image, a green image, a blue image, a first gray image, a second gray image, a third gray image and a black image;
wherein the plurality of first type template images comprise a first type red template image, a first type green template image, a first type blue template image, a first type first gray template image, a first type second gray template image, a first type third gray template image and a first type black template image;
wherein the first unit is configured to compare each of the images to be compared with a corresponding first type template image; and
wherein the second unit is configured to mark the active matrix organic light emitting diode panel as a first type product in case that all of the images to be compared match with seven corresponding first type template images respectively.

11. The apparatus according to claim 9, wherein the second unit is further configured to:
store images that do not match with any one of the n groups of second type template images into the second type template image sub-library and to determine the group to which the images that do not match belong; and
trigger the first unit to detect and classify the active matrix organic light emitting diode panel afresh.

12. The apparatus according to claim 9, wherein the first unit is further configured to calculate similarity between the images to be compared which are collected from the active matrix organic light emitting diode panel and the template images in the preset template image library and to compare the similarity with a preset similarity threshold.

13. An apparatus for detecting and classifying an active matrix organic light emitting diode panel, the apparatus including: a processor and a memory, the processor being configured to execute instructions including a first process to compare images to be compared which are collected from the active matrix organic light emitting diode panel with template images in a preset template image library; and a second process to classify the active matrix organic light emitting diode panel depending on results of the comparing,
wherein the images to be compared comprise a plurality of images to be compared which are collected respectively from the active matrix organic light emitting diode panel;
wherein the preset template image library comprises:
a first template image sub-library, which comprises a plurality of first type template images corresponding to at least one or all of the plurality of images to be compared respectively; and
a second template image sub-library, which comprises a plurality of second type template images corresponding to at least one or all of the plurality of images to be compared respectively;
wherein the second template image sub-library comprises n groups of second type template images, where n is a positive integer greater than or equal to one;
wherein the first process is configured to compare each of the images to be compared with a corresponding first type template image, and to compare the images to be compared with the second type template images in each group of second type template images respectively if any one of the images to be compared does not match with the corresponding first type template image; and
wherein the second process is configured to mark the active matrix organic light emitting diode panel as a first type product if all of the images to be compared match with corresponding first type template images respectively, or to mark the active matrix organic light emitting diode panel as a second type product with a numeral of i if all of the images to be compared match with an $i^{th}$ group of second type template images respectively, where i is greater than or equal to one but less than or equal to n.

* * * * *